United States Patent
Huang

(10) Patent No.: US 12,220,776 B1
(45) Date of Patent: Feb. 11, 2025

(54) METHOD FOR MANUFACTURING A CLUB HEAD

(71) Applicant: Jung-Hsien Huang, Kaohsiung (TW)

(72) Inventor: Jung-Hsien Huang, Kaohsiung (TW)

( * ) Notice: Subject to any disclaimer, the term of this patent is extended or adjusted under 35 U.S.C. 154(b) by 0 days.

(21) Appl. No.: 18/654,535

(22) Filed: May 3, 2024

(51) Int. Cl.
  *B23P 15/00* (2006.01)
  *A63B 53/04* (2015.01)
  *B21D 53/00* (2006.01)
  *B21K 17/00* (2006.01)

(52) U.S. Cl.
  CPC .............. *B23P 15/00* (2013.01); *B21D 53/00* (2013.01); *A63B 53/047* (2013.01); *B21K 17/00* (2013.01)

(58) Field of Classification Search
  CPC .......... A63B 53/047; A63B 2053/0479; A63B 2053/0483; B23P 15/00; B23P 2700/00; B21D 11/10; B21D 22/02; B21D 22/06; B21D 22/20; B21D 22/21; B21D 35/001–002; B21D 53/00; B21J 5/02–027; B21K 17/00
  See application file for complete search history.

(56) References Cited

U.S. PATENT DOCUMENTS

| | | | |
|---|---|---|---|
| 9,586,105 B1 * | 3/2017 | Westrum | A63B 60/42 |
| 2009/0253531 A1 * | 10/2009 | Doi | A63B 53/04 |
| | | | 473/324 |
| 2012/0214612 A1 * | 8/2012 | Kondo | B21K 17/00 |
| | | | 72/352 |

FOREIGN PATENT DOCUMENTS

| | | | |
|---|---|---|---|
| TW | I270421 B | | 1/2007 |
| TW | 201109063 A | * | 3/2011 |

* cited by examiner

*Primary Examiner* — Matthew P Travers
(74) *Attorney, Agent, or Firm* — Rosenberg, Klein & Lee

(57) ABSTRACT

A method is adapted to manufacture a club head with a bending portion, a hosel, and a head face. The method includes preparing a metal blank having an engagement segment, a head segment, and a neck segment. The method includes a bending and pressing step for pressing the head segment and the engagement segment, thereby forming a bending contour serving as the bending portion and forming a face region and a waste unit protruding therefrom. The method includes a punching step for punching the neck segment, thereby forming a peripheral wall with a trough which serves as the hosel. The method includes a trimming step for flattening the face region and removing the waste unit, thereby achieving the head face. The punching step is conducted before or after the bending and pressing step. The method is executed in a simplified manner and reduces production costs and defective products.

6 Claims, 7 Drawing Sheets us 12,220,776 b1

METHOD FOR MANUFACTURING A CLUB HEAD

BACKGROUND OF THIS INVENTION

1. Field of this Invention

This invention relates to a manufacturing method and relates particularly to a method for manufacturing a club head.

2. Description of the Related Art

Owing to the increasing progress of society and the improved standard of living, various recreational activities are available. In the type of recreational ball games, golf both provides interests and requires skills, thereby being popular and enjoyed widely by people of all ages. Golf can be played alone for a purpose of skills practice or played with a group of people for a purpose of competition in a golf course. During golfing, different terrains of the golf course can provide physical challenge. Different landscapes of the golf course allow people to be immersed in the natural environment, thereby relieving physical and mental stress. Hence, golf becomes popular among people of all ages and further captures the public's attention to facilities for playing golf, particularly golf clubs. The golf clubs are sorted according to different types of club heads, such as drivers, fairway woods, hybrids, irons, wedges, and putters.

Generally, a club head is manufactured by a casting method or a forging method. Referring to FIG. 1, Taiwan patent no. I270421 discloses a method for forging a club head under a constant temperature. The method comprises steps of feeding blanks, forging with a constant temperature, processing an outer contour of the club head, and processing an outer surface of the club head. In the method, a metal blank and a forming die are heated to have the same temperature while executing a forging operation, thereby obtaining the club head. The club head is then processed by trimming the outer contour and the outer surface. However, in the disclosed method, the metal blank and the forming die should be maintained in a high and constant temperature in order to execute the forging operation. Thus, energy consumption is increased. In order that the metal blank can spread and fill the forming die fully, the metal blank with a larger portion is usually applied so that the metal blank extends according to the shape of the forming die to form the club head properly. However, a surplus material of the metal blank is left because of the forging action and flows outside the forming die to form an extensive waste unit disposed around an outer periphery of the club head. Accordingly, the costs for removing the extensive waste unit are increased. Further, an extensive line-shaped mark will be formed along the outer periphery of the club head after the waste unit is removed, and that requires to be improved.

SUMMARY OF THIS INVENTION

The object of this invention is to provide a method for manufacturing a club head capable of reducing a consumption of metal blank to attain a sufficient use, prevents an improper overflow of surplus material, and reducing production costs and defective products.

The method for manufacturing a club head of this invention is disclosed. The club head includes a hosel extending toward one direction, a head face extending toward another direction and adapted to hit a golf ball, and a bending portion formed between the hosel and the head face. The method includes a preparing step, a bending and pressing step, a punching step, and a trimming step. In the preparing step, a metal blank is prepared. The metal blank has a cylindrical neck segment, a cylindrical head segment opposite to the neck segment, and an engagement segment extending between and tapered from the head segment toward the neck segment so that the engagement segment is formed in a frustum shape. A maximum outer diameter of the head segment is larger than a maximum outer diameter of the neck segment. In the bending and pressing step, a stamping device having a stamping die and a stamping unit movably installed relative the stamping die is adapted to execute a stamping operation. The stamping die has a first cavity enclosed by a first wall, a second cavity enclosed by a second wall, and a receiving opening formed in the first cavity. The first cavity has a first contour outlining a hitting appearance. The second cavity has a second contour outlining a transition appearance. The stamping operation is executed by pressing the head segment and the engagement segment with the stamping unit concurrently after the engagement segment is situated in the second cavity and the head segment is situated in the first cavity so that a junction of the engagement segment and the head segment is bended caused by the pressing action of the stamping unit to form a first surface joined to the neck segment and a second surface connected to the first surface and extended by a length, with an included angle defined by a junction of the first surface and the second surface so that the first surface and the second surface are joined together to provide a bending contour corresponding to the transition appearance, which thereby serves as the bending portion of the club head. Meanwhile, the pressing action of the stamping unit allows the head segment to spread and fill the first cavity to form a face region joined to the second surface. The face region has a head-shaped contour corresponding to the hitting appearance. During the stamping operation, a surplus material of the metal blank is left and introduced into the receiving opening to form a waste unit protruding from the face region after the metal blank is separated from the stamping die. In the punching step, a punching device having a punching die and a punching unit movably installed relative the punching die is adapted to execute a punching operation. The punching operation is executed by exerting punching forces on a portion of the neck segment with the punching unit after the neck segment of the metal blank is positioned in the punching die to allow an outer periphery of the neck segment to be clamped by the punching die in position. The neck segment is extended caused by the punching action of the punching device to form a peripheral wall and a trough enclosed by the peripheral wall, which thereby serves as the hosel of the club head. In the trimming step, a processing device having a cutting unit is adapted to execute a cutting operation. The cutting operation is executed by cutting a surface of the face region obtained in the bending and pressing step with the cutting unit to flatten the surface of the face region and remove the waste unit from the face region while flattening the surface of the face region. The face region thereby serves as the head face of the club head for hitting the golf ball after being treated in the cutting operation. The club head is then formed after the cutting operation is completed. After the preparing step is executed, the punching step or the bending and pressing step is executed according to needs, and the trimming step is the final step. Because the surplus material of the metal blank is accommodated at the receiving opening of the stamping die, it prevents the surplus material from flowing outside the stamping die. The removal of the waste unit is easy and will not leave an extensive mark. The method is executed in a simplified and accelerated manner, reduces the consumption of the metal blank to achieve a sufficient use, increases the strength of the club head, and reduces the production costs and the defective products effectively.

Preferably, the bending and pressing step is conducted after the preparing step. The punching step is conducted after the bending and pressing step. The trimming step is conducted after the punching step.

Preferably, the punching step is conducted after the preparing step. The bending and pressing step is conducted after the punching step. The trimming step is conducted after the bending and pressing step.

Preferably, the punching die of the punching device has two opposite die units installed relative to each other. The die units are engaged together to assume a close state so that the outer periphery of the neck segment is clamped by the die units to prevent the maximum outer diameter of the neck segment from being changed improperly.

Preferably, one end of the head segment opposite to the engagement segment has an arched shape.

Preferably, the club head is an iron type club head.

DETAILED DESCRIPTION OF THE PREFERRED EMBODIMENTS

Figure 1:
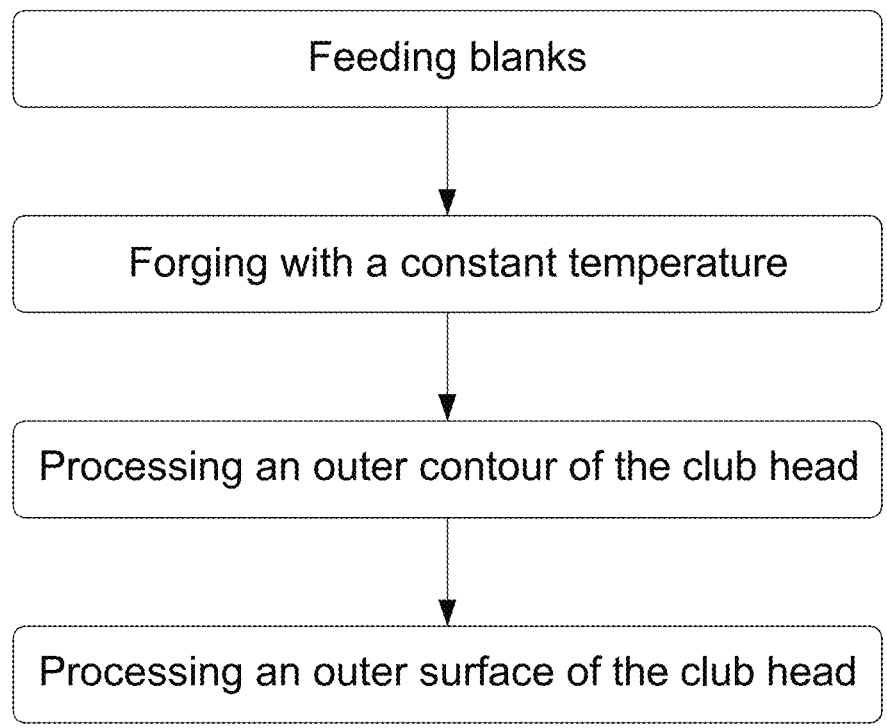
FIG. 1 is a block diagram showing steps of a conventional method for forging a club head under a constant temperature disclosed by Taiwan patent no. I270421.
Figure 2:
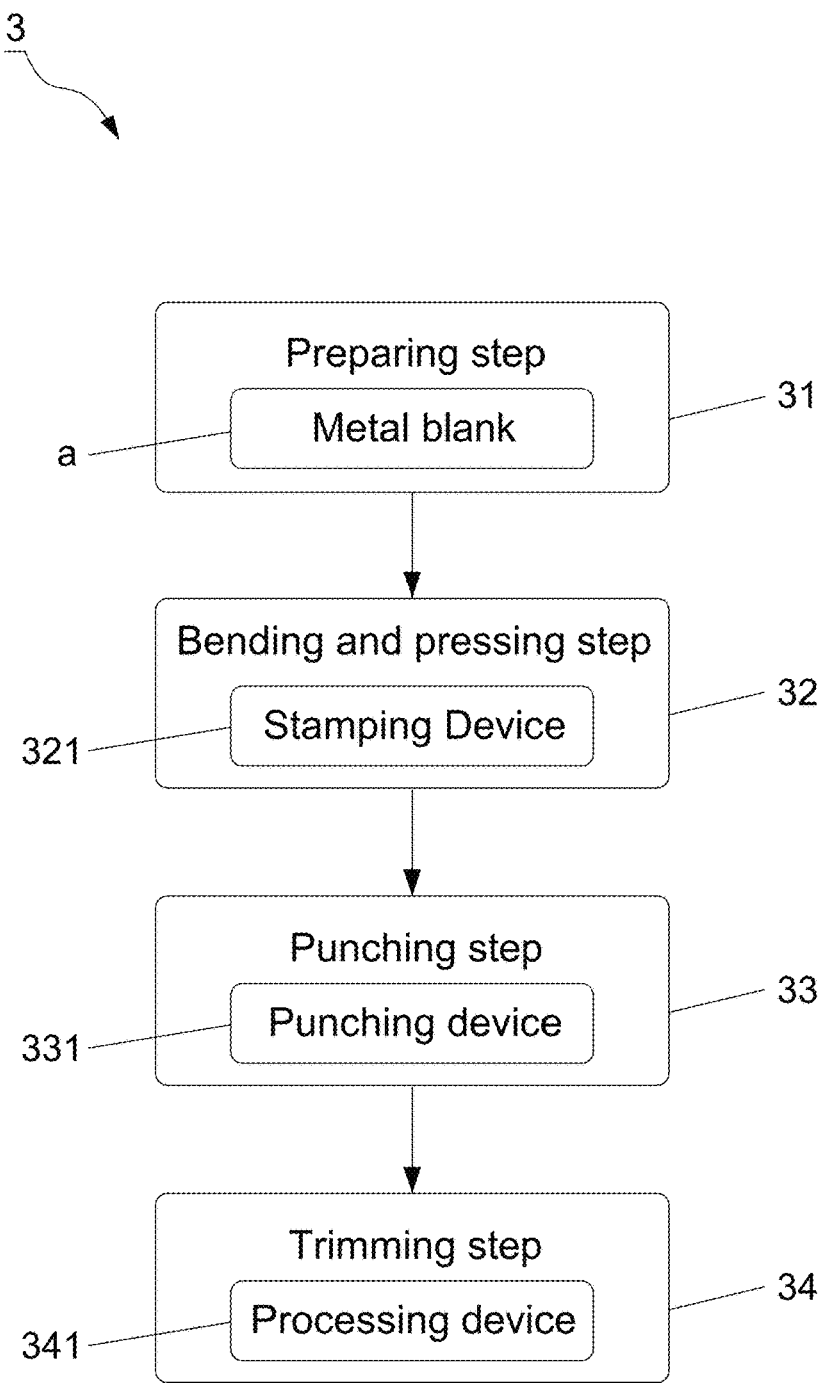
FIG. 2 is a block diagram showing steps of a first preferred embodiment of this invention in sequential order.
Figure 3:
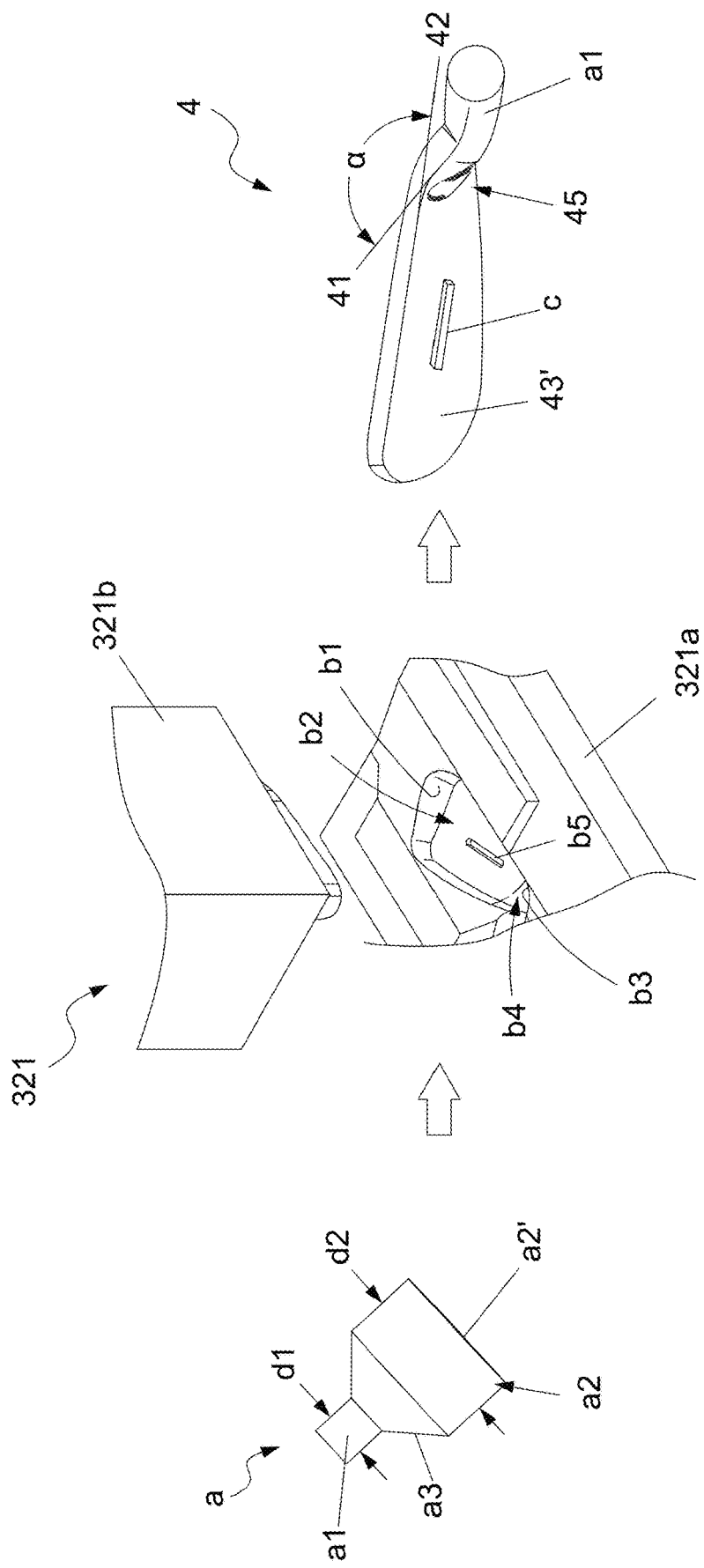
FIG. 3 is a schematic view showing the bending and pressing step of the first preferred embodiment of this invention.
Figure 6:
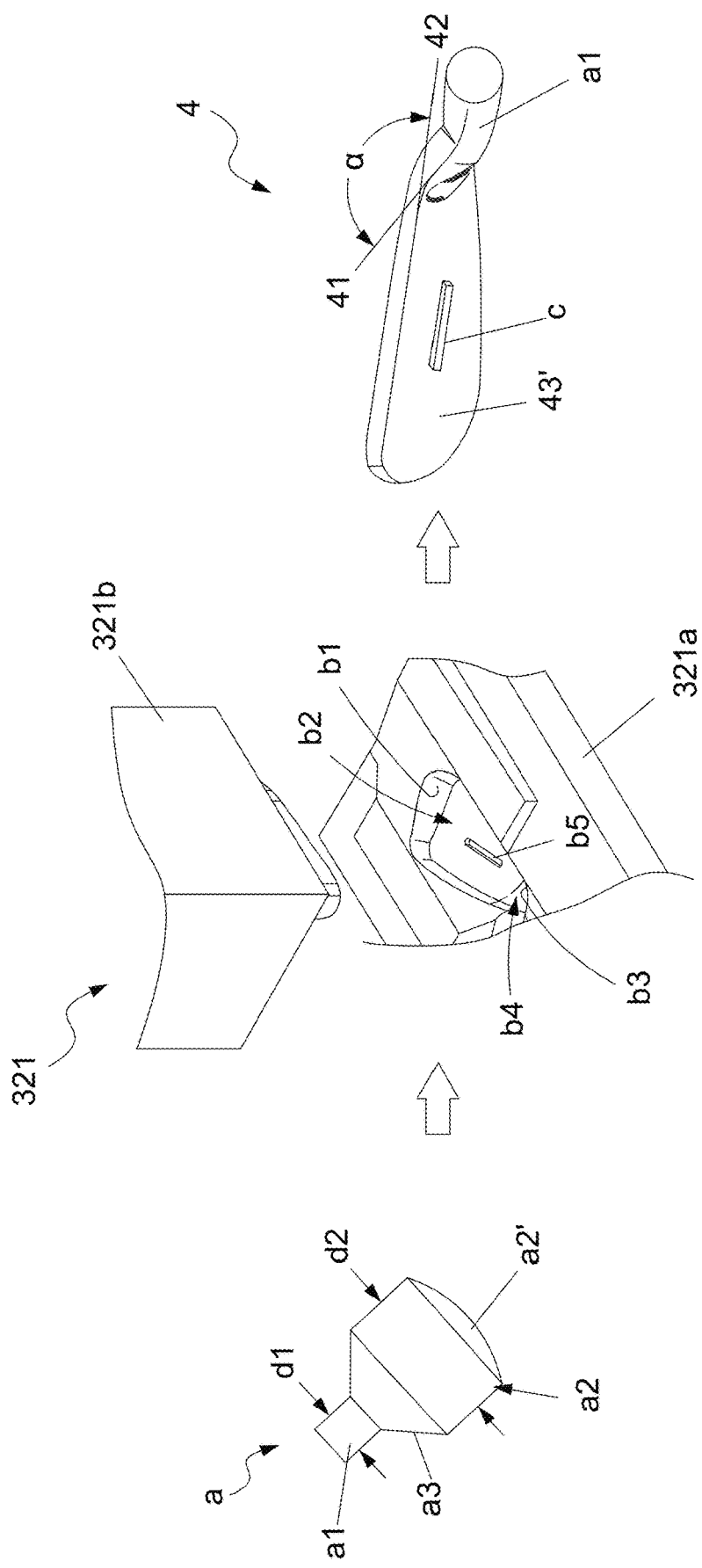
FIG. 6 is a schematic view showing another variation of the metal blank in the bending and pressing step of the first preferred embodiment of this invention.

Referring to FIGS. 2 and 3, a method 3 for manufacturing a club head 4 of a first preferred embodiment of this invention is disclosed. The club head 4 includes a hosel 44 extending toward one direction, a head face 43 extending toward another direction for hitting a golf ball (not shown), and a bending portion 45 formed between the hosel 44 and the head face 43. The club head 4 in this preferred embodiment is an iron type club head. The method 3 includes a preparing step 31, a bending and pressing step 32, a punching step 33, and a trimming step 34. The preparing step 31 is performed by preparing a metal blank a. The metal blank a has a cylindrical neck segment a1, a cylindrical head segment a2 opposite to the neck segment a1, and an engagement segment a3 connected between the neck segment a1 and the head segment a2. A maximum outer diameter d2 of the head segment a2 is larger than a maximum outer diameter d1 of the neck segment a1. The engagement segment a3 is tapered from the head segment a2 toward the neck segment a1 so that the engagement segment a3 is in the form of a frustum. One end a2' of the head segment a2 opposite to the engagement segment a3 has an arched shape as shown in FIG. 6 or a flattened shape as shown in FIG. 3 whereby the method 3 is conducted in a quick manner according to different processing requirements. Here takes an example that the one end a2' of the head segment a2 has a flattened shape.

The bending and pressing step 32 is performed by subjecting the metal blank a to a stamping operation by using a stamping device 321. The stamping device 321 is shown in a simplified drawing in this preferred embodiment. The stamping device 321 has a stamping die 321a and a stamping unit 321b movably disposed relative to the stamping die 321a. The stamping die 321a has a first cavity b2 enclosed by a first wall b1, a second cavity b4 enclosed by a second wall b3, and a receiving opening b5 formed in the first cavity b2. The first cavity b2 has a first contour drawing a hitting appearance. The second cavity b4 has a second contour drawing a transition appearance. The receiving opening b5 is adapted to receive a surplus material of the metal blank a. In the stamping operation, the metal blank a is positioned in the stamping die 321a to allow the head segment a2 to be situated in the first cavity b2 and adjacent to the first wall b1 of the first cavity b2 and to allow the engagement segment a3 to be situated in the second cavity b4. The stamping unit 321b is then adapted to press the head segment a2 and the engagement segment a3 concurrently so that the head segment a2 and the engagement segment a3 extend according to the shape of the stamping die 321a. Namely, the pressing action of the stamping unit 321b bends a junction of the engagement segment a3 and the head segment a2 to form a first surface 41 connected to the neck segment a1 and a second surface 42 connected to the first surface 41 and extended by a length. An included angle α is defined by a junction of the first surface 41 and the second surface 42 whereby the first surface 41 and the second surface 42 are connected together to provide a bending contour corresponding to the transition appearance, which thereby serves as the bending portion 45 of the club head 4. The head segment a2 is also pressed by the stamping unit 321b whereby the head segment a2 extends and fills the first cavity b2 to form a face region 43' joined to the second surface 42. The face region 43' has a head-shaped contour corresponding to the hitting appearance. Owing to the pressing action of the stamping unit 321b, the surplus material of the metal blank a is remained and accumulated at the receiving opening b5 whereby a waste unit c protruding from the face region 43' is formed after the metal blank a is separated from the stamping die 321a.

Figure 4:
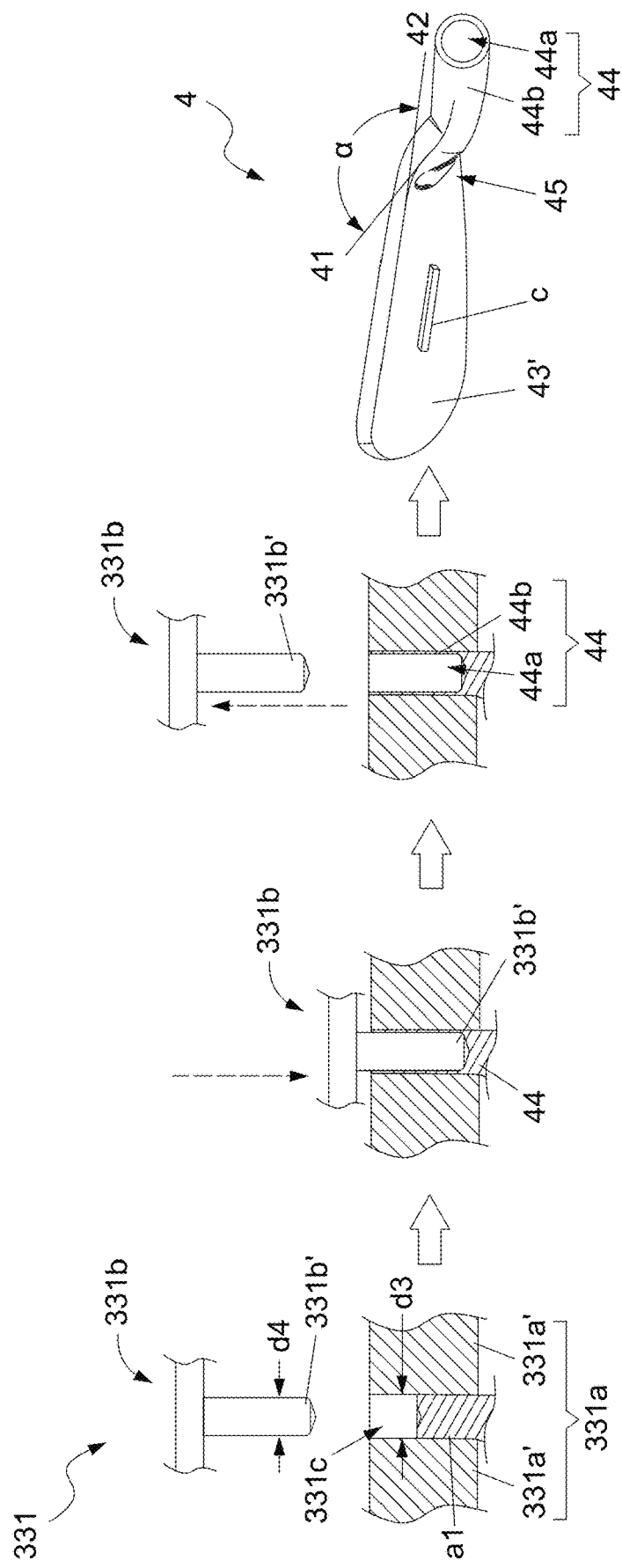
FIG. 4 is a schematic view showing the punching step of the first preferred embodiment of this invention.

Referring to FIG. 4, the punching step 33 is performed by subjecting the metal blank a to a punching operation by using a punching device 331. The punching device 331 has a punching die 331a and a punching unit 331b movably disposed relative to the punching die 331a. In this preferred embodiment, the punching die 331a includes two die units 331a' opposite to each other. A punching space 331c is defined when the two die units 331a' are engaged with each other to assume a close state. The punching unit 331b has an inserted end 331b' capable of being inserted into the punching space 331c. An outer diameter d4 of the inserted end 331b' of the punching unit 331b is smaller than an inner diameter d3 of the punching space 331c. In the punching operation, the die units 331a' are engaged together to assume a close state after the neck segment a1 is positioned between the die units 331a' whereby the neck segment a1 is situated in the punching space 331c and an outer periphery of the neck segment a1 is clamped by the die units 331a'. After that, the inserted end 331b' of the punching unit 331b is moved and inserted into the punching space 331*c* to exert punching forces on a portion of the neck segment a1 and force the neck segment a1 to extend so that the neck segment a1 is extended to form a peripheral wall 44*b* and a trough 44*a* enclosed by the peripheral wall 44*b*, which thereby serves as the hosel 44 of the club head 4. Meanwhile, the maximum outer diameter d1 of the neck segment a1 is restricted by the punching space 331*c* enclosed by the die units 331*a*' to thereby prevent an improper change in the maximum outer diameter d1 of the neck segment a1.

Figure 5:
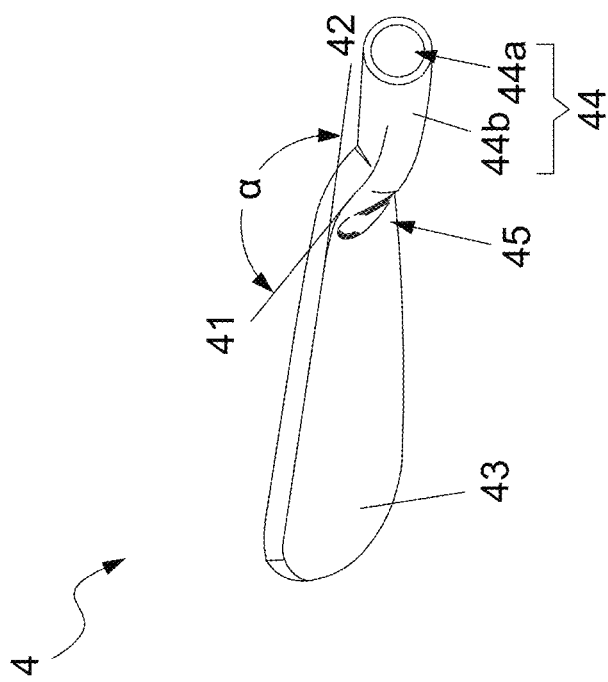
FIG. 5 is a schematic view showing the trimming step of the first preferred embodiment of this invention.
Figure 5:
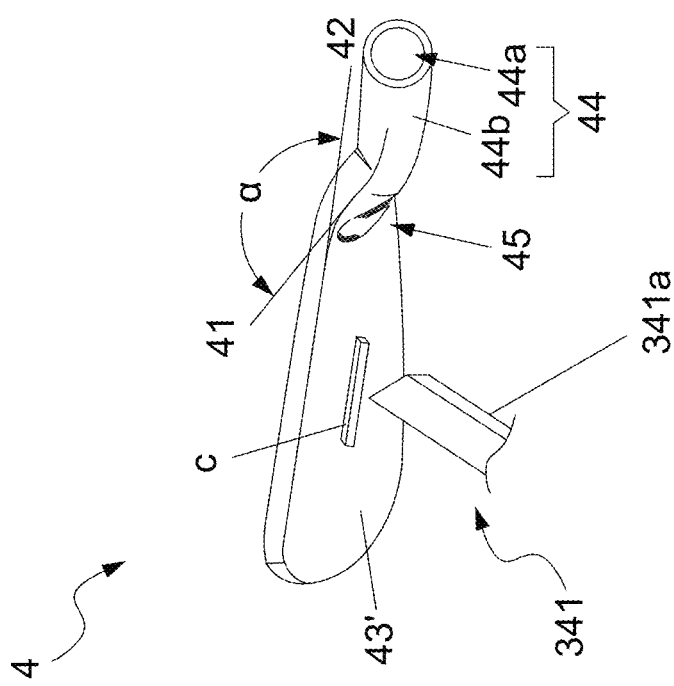

Referring to FIG. 5, the trimming step 34 is performed by subjecting the metal blank a to a cutting operation by using a processing device 341. The processing device 341 has a cutting unit 341*a*. In this cutting operation, a surface of the face region 43' attained by the bending and pressing step 32 is trimmed with the cutting unit 341*a* to flatten the surface of the face region 43' and remove the waste unit c from the face region 43' while flattening the surface of the face region 43'. The face region 43' which is subjected to the cutting operation thereby serving as the head face 43 of the club head 4 for hitting the golf ball. The club head 4 is formed after the cutting operation.

Referring to FIGS. 2 to 6, after the metal blank a is prepared in the preparing step 31, the metal blank a is subjected to the stamping operation conducted by the stamping device 321 in the bending and pressing step 32. The metal blank a is situated in the stamping die 321*a* so that the engagement segment a3 is positioned in the second cavity b4 and the head segment a2 is positioned in the first cavity b2. The head segment a2 is adjacent to the first wall b1 of the first cavity b2 after the head segment a2 is positioned properly. The neck segment a1 is preferably situated outside the stamping die 321*a* so that the neck segment a1 will not be pressed by the stamping unit 321*b*. After that, the head segment a2 and the engagement segment a3 are stamped by the stamping unit 321*b* concurrently whereby the junction of the engagement segment a3 and the head segment a2 is bended and turned into the first surface 41 connected to the neck segment a1 and the second surface 42 connected to the first surface 41 and extended by a length. The included angle α is defined by the junction of the first surface 41 and the second surface 42 whereby the first surface 41 and the second surface 42 are joined to each other to provide the bending contour corresponding to the transition appearance, and thus the bending portion 45 of the club head 4 is achieved. Meanwhile, the head segment a2 is also stamped by the stamping unit 321*b* whereby the first cavity b2 is stuffed with the head segment a2 to thereby form the face region 43' having the head-shaped contour corresponding to the hitting appearance. During the stamping operation, the surplus material of the metal blank a is introduced and accommodated at the receiving opening b5 whereby the waste unit c is formed on the face region 43' after the metal blank a is removed from the stamping die 321*a*. Thus, the face region 43' and the bending portion 45 are formed evenly and properly without being too thick or too thin because the surplus material is received within the receiving opening b5 duly, thereby reducing the consumption of the metal blank a to attain a sufficient use of the metal blank a and reducing the defective products. Further, the waste unit c only occupies a small area on the face region 43'.

After that, the metal blank a is subjected to the punching operation conducted by the punching device 331 in the punching step 33. After the neck segment a1 is situated between the die units 331*a*', the die units 331*a*' are engaged to each other to assume a close state and allow the neck segment a1 to be positioned within the punching space 331*c* and clamped by the die units 331*a*' of the punching die 311*a*. The inserted end 331*b*' of the punching unit 331*b* is then activated to exert punching forces on a portion of the neck segment a1. Because the outer diameter d4 of the inserted end 331*b*' is smaller than the inner diameter d3 of the punching space 331*c*, the neck segment a1 is forced to extend and form the peripheral wall 44*b* and the trough 44*a* enclosed by the peripheral wall 44*b*, and thus the hosel 44 of the club head 4 is achieved. Meanwhile, the maximum outer diameter d1 of the neck segment a1 is restricted by the punching space 331*c* while the neck segment a1 is punched by the inserted end 331*b*'. Both the stamping operation of the stamping device 321 and the punching operation of the punching device 331 help increase the strength of the face region 43', the bending portion 45, and the hosel 44. Finally, the face region 43' is subjected to the cutting operation conducted by the processing device 341 in the trimming step 34. The surface of the face region 43' is cut and flattened by the cutting unit 341*a* of the processing device 341, thereby separating the waste unit c from the face region 43' while cutting the surface of the face region 43'. Thus, the head face 43 of the club head 4 for hitting the golf ball is achieved after the face region 43' passes through the cutting operation. The club head 4 is therefore achieved after the cutting operation is completed. Hence, the waste unit c only occupies a small area on the face region 43', and that reduces the costs and simplifies the operation for removing the waste unit c. The removal of the waste unit c will not leave an extensive mark. The head face 43 of the club head 4 remains flat and meets the standards. The method 3 facilitates a quick and simple operation for manufacturing the club head 4, reduces the consumption of the metal blank a to attain a sufficient use, increases the strength of the club head 4, reduces the defective products, and reduces the production costs.

Figure 7:
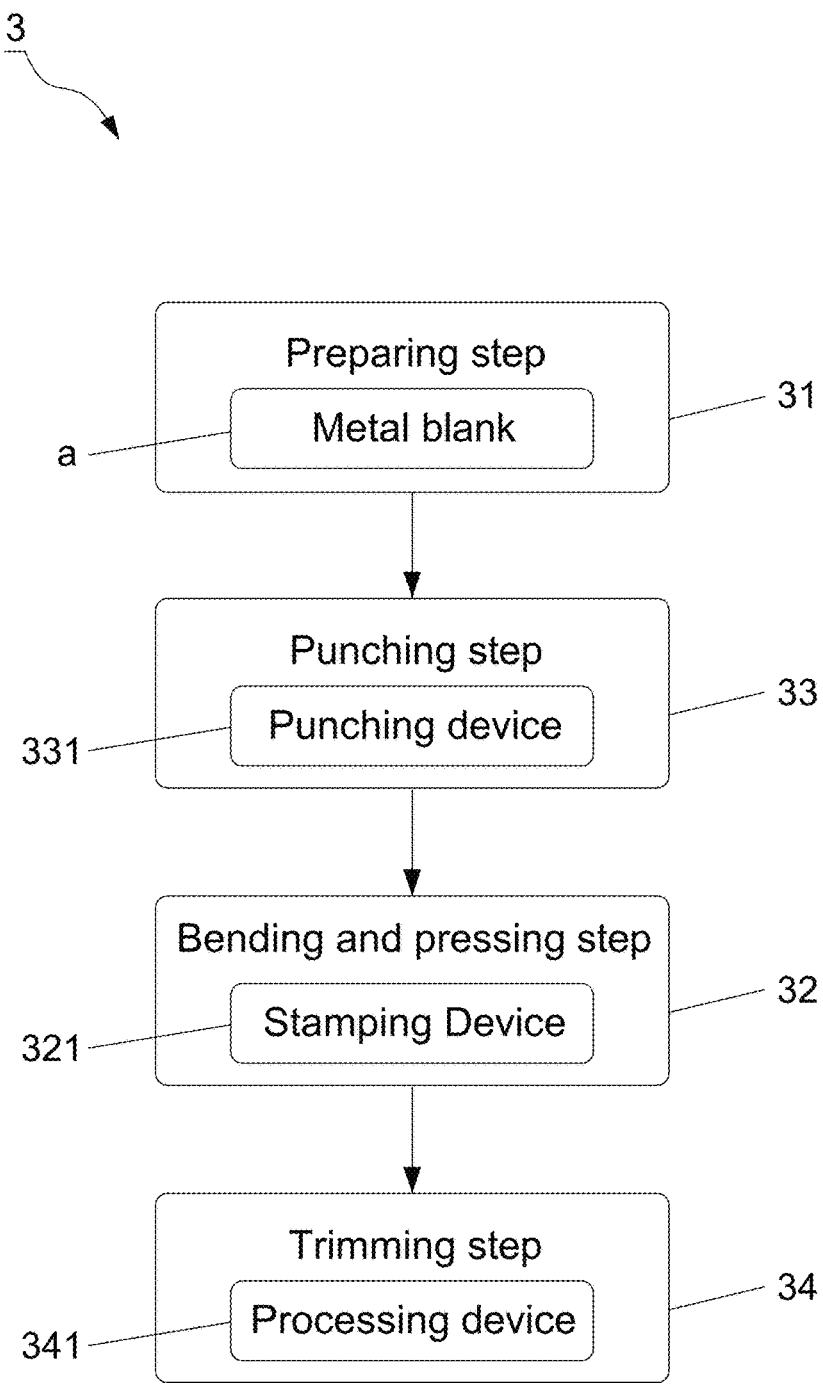
FIG. 7 is a block diagram showing steps of a second preferred embodiment of this invention in sequential order.

Referring to FIG. 7 shows a second preferred embodiment of the method 3 for manufacturing a club head 4 of this invention which still includes a preparing step 31, a bending and pressing step 32, a punching step 33, and a trimming step 34. The concatenation of correlated elements, operations and objectives of this preferred embodiment are the same as those of the first preferred embodiment. The second preferred embodiment is characterized in that the punching step 33 is executed after the preparing step 31. The bending and pressing step 32 is executed after the punching step 33. The trimming step 34 is executed after the bending and pressing step 32. In other words, after the metal blank a is prepared in the preparing step 31, the neck segment a1 of the metal blank a is subjected to the punching operation conducted by the punching device 331 to form the peripheral wall 44*b* and the trough 44*a* whereby the hosel 44 is attained as shown in the FIG. 4. After that, the head segment a2 and the engagement segment a3 of the metal blank a are subjected to the stamping operation conducted by the stamping device 321 to form the bending portion 45 and the face region 43' accordingly as shown in FIG. 3. Meanwhile, the surplus material of the metal blank a is accommodated at the receiving opening b5 of the stamping die 321*a* to form the waste unit c on the face region 43' after the metal blank a is separated from the stamping die 321*a*. Finally, the face region 43' is subjected to the cutting operation conducted by the processing device 341, thereby flattening the face region 43' and removing the waste unit c. Thus, the head face 43 is attained as shown in FIG. 5. The club head 4 is formed after the cutting operation is finished. Although the executing sequence of the bending and pressing step 32 and the punching step 33 are changed, the method 3 still can achieve the effects of facilitating a quick and simple operation for manufacturing the club head 4, reducing the consumption of the metal blank a to attain a sufficient use, increasing the strength of the club head 4, reducing the defective products, and reducing the production costs.

To sum up, the method of this invention includes a preparing step, a bending and pressing step, a punching step, and a trimming step. The metal blank having the engagement segment extended between the head segment and the neck segment is prepared in the preparing step. In the bending and pressing step, the metal blank is situated in the stamping die of the stamping device to allow the head segment and the engagement segment to be positioned in the first cavity and the second cavity respectively. The head segment and the engagement segment are pressed concurrently by the stamping unit whereby the junction of the engagement segment and the head segment is bended to form the first surface and the second surface, with the included angle defined by the junction of the first surface and the second surface. Thus, the first surface and the second surface are joined together to provide the bending contour, which thereby serves as the bending portion of the club head. Meanwhile, the head segment is also pressed and extended in the first cavity to form the face region having the head-shaped contour. The surplus material of the metal blank is remained and introduced into the receiving opening of the stamping die to form the waste unit protruding from the face region after the metal blank is removed from the stamping die. In the punching step, after the neck segment is clamped by the punching die of the punching device, punching forces are exerted to a portion of the neck segment so that the neck segment is extended to form the peripheral wall and the trough, which thereby serves as the hosel of the club head. In the trimming step, the surface of the face region is trimmed by the cutting unit of the processing device so that the surface of the face region is flattened and the waste unit is removed, which thereby serves as the head face of the club head for hitting the golf ball. And, the club head is completed. Thus, the surplus material of the metal blank will not flow outside the stamping die. The waste unit formed by the surplus material only occupies a small area on the face region, and thus the removal of the waste unit will not leave an extensive mark. The costs for removing the waste unit is reduced. The method also is executed in a quick and simplified manner, reduces the consumption of the metal blank to achieve a sufficient use, increases the strength of the club head, reduces the production costs, and reduces the defective products.

While the embodiments of this invention are shown and described, it is understood that further variations and modifications may be made without departing from the scope of this invention.

What is claimed is:

1. A method for manufacturing a club head, said club head including a hosel extending toward one direction, a head face extending toward another direction for hitting a golf ball, and a bending portion formed between said hosel and said head face, said method comprising:

a preparing step which includes preparing a metal blank, said metal blank including a cylindrical neck segment, a cylindrical head segment, and an engagement segment disposed between said neck segment and said head segment, wherein a maximum outer diameter of said head segment is larger than a maximum outer diameter of said neck segment, said engagement segment being in the form of a frustum;

a bending and pressing step which includes subjecting said metal blank to a stamping operation by using a stamping device, said stamping device including a stamping die and a stamping unit movably disposed relative to said stamping die, wherein said stamping die has a first cavity enclosed by a first wall, a second cavity enclosed by a second wall, and a receiving opening disposed in said first cavity, said first cavity having a first contour, said second cavity having a second contour, wherein said stamping operation includes placing said metal blank in said stamping die in position so that said engagement segment is situated in said second cavity, and said head segment is situated in said first cavity and then pressing said head segment and said engagement segment with said stamping unit concurrently, the pressing action of said stamping unit bending a junction of said engagement segment and said head segment to form a first surface joined to said neck segment and a second surface connected to said first surface and extended by a length, with an included angle defined by a junction of said first surface and said second surface so that said first surface and said second surface are joined to each other to provide a bending contour corresponding to said second contour, which thereby serves as said bending portion of said club head, the pressing action of said stamping unit also pressing said head segment so that said head segment spreads and fills said first cavity to form a face region joined to said second surface, with said face region having a head-shaped contour corresponding to said first contour, a surplus material of said metal blank being left because of the pressing action of said stamping unit and accumulated at said receiving opening, said surplus material protruding from said face region after said metal blank is separated from said stamping die;

a punching step which includes subjecting said metal blank to a punching operation by using a punching device, said punching device including a punching die and a punching unit movably disposed relative to said punching die, wherein said punching operation includes placing said neck segment of said metal blank in said punching die so that an outer periphery of said neck segment is clamped by said punching die and then exerting punching forces on a portion of said neck segment with said punching unit to force said neck segment to extend, said neck segment being extended to form a peripheral wall and a trough enclosed by said peripheral wall, which thereby serves as said hosel of said club head; and a trimming step which includes subjecting said metal blank to a cutting operation by using a processing device, said processing device including a cutting unit, said cutting operation includes cutting a surface of said face region achieved by said bending and pressing step with said cutting unit to flatten said surface of said face region and remove said surplus material from said face region while flattening said surface of said face region, said face region which undergoes said cutting operation thereby serving as said head face of said club head for hitting said golf ball, said club head being formed after said cutting operation.

2. The method according to claim 1, wherein said bending and pressing step is conducted after said preparing step, said punching step is conducted after said bending and pressing step, and said trimming step is conducted after said punching step.

3. The method according to claim 1, wherein said punching step is conducted after said preparing step, said bending and pressing step is conducted after said punching step, and said trimming step is conducted after said bending and pressing step.

4. The method according to claim 1, wherein said punching die of said punching device includes two opposite die units, said two die units being engaged with each other to assume a closed state so that said outer periphery of said neck segment is clamped by said two die units to prevent a change in said maximum outer diameter of said neck segment.

5. The method according to claim 1, wherein one end of said head segment opposite to said engagement segment has an arched shape.

6. The method according to claim 1, wherein said club head is an iron club head.

* * * * *